United States Patent [19]

Edwards

[11] 4,257,652
[45] Mar. 24, 1981

[54] DEVICE FOR TRANSPORTING MATERIALS ACROSS FRAGILE STRUCTURES

[76] Inventor: Charles R. Edwards, 2412 N. Thorne, Fresno, Calif. 93704

[21] Appl. No.: 961,988

[22] Filed: Nov. 20, 1978

[51] Int. Cl.³ .............................................. B62D 55/24
[52] U.S. Cl. ........................................ 305/24; 305/32; 305/35 EB; 180/9.48
[58] Field of Search ................. 180/9.2 R, 9.62, 9.64, 180/9.48, 14 R; 305/24, 32, 29, 35 EB, 38

[56] References Cited

U.S. PATENT DOCUMENTS

| 1,792,759 | 2/1931 | Polakoff | 305/32 |
| 2,855,059 | 10/1958 | Sutherland | 305/32 X |
| 3,074,499 | 1/1963 | Bertelsen . | |
| 3,108,564 | 10/1963 | Prosser | 305/35 EB |
| 3,205,961 | 9/1965 | Nolte | 180/9.48 |
| 3,398,806 | 8/1968 | Hendricks . | |
| 3,761,040 | 9/1973 | Cummins . | |
| 3,950,038 | 4/1976 | Wood . | |

FOREIGN PATENT DOCUMENTS 1194271 11/1962 Fed. Rep. of Germany .......... 180/9.48

Primary Examiner—David A. Scherbel
Attorney, Agent, or Firm—Huebner & Worrel

[57] ABSTRACT

A device having a frame with a supporting platform, a pair of substantially cylindrical assemblies mounted for rotational movement on the frame about substantially parallel axes of rotation, a resilient substantially flat belt extended about the assemblies, and a drive mechanism for rotating one of the assemblies about its axis of rotation to move the belt in transporting relation to the frame.

2 Claims, 7 Drawing Figures

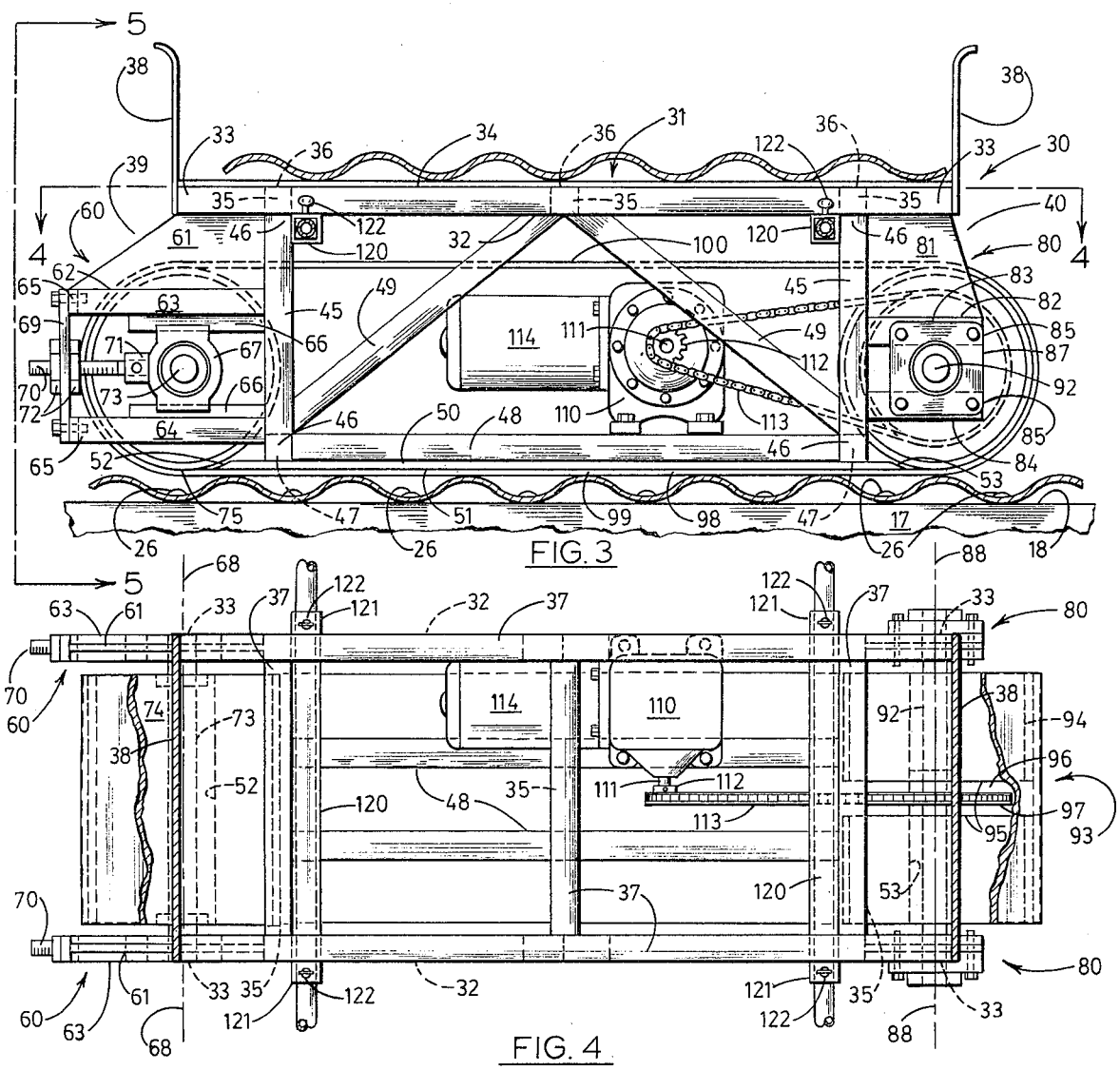
FIG. 3
FIG. 4
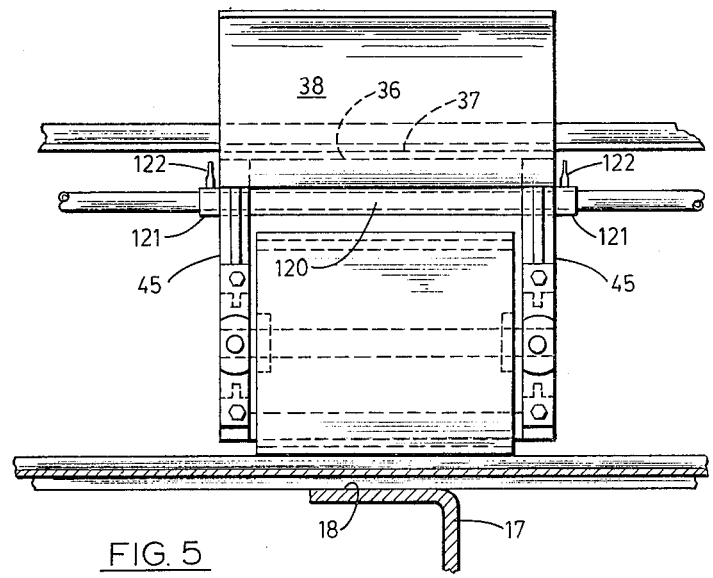
FIG. 5

DEVICE FOR TRANSPORTING MATERIALS ACROSS FRAGILE STRUCTURES

BACKGROUND OF THE INVENTION

1. Field of the Invention

The present invention relates to a device for transporting materials over fragile structures and more particularly to such a device which can be used individually or in multiples to transport such materials as sheet metal over the sloped roofs of buildings during construction without damaging the roofs; which serves as a supply and support station during construction; and which minimizes the risk that workers or the device itself could fall from the roof.

2. Description of the Prior Art

The Bertelsen U.S. Pat. No. 3,047,499 relates to a self-propelled vehicle track having an air pressure system for urging the load of the power mechanisms out of physical contact with the ground engaging portion of the track.

The Hendricks U.S. Pat. No. 3,398,806 discloses a self-propelled crawler-type mobile platform utilizing two matching individually powered crawler-type dollies ridgidly tied together in spaced relation by a spanner member having a load carrying deck and operated from a position remote from the dollies for use on a sub-roof of a building.

The Cummins U.S. Pat. No. 3,761,040 is directed to a remote control helicopter transport device having tracks and method.

The Wood U.S. Pat. No. 3,950,038 discloses a fluid bearing track device having a pair of rollers about which is extended a ribbed belt.

There are a great many problems in large construction operations incident to the use of lightweight materials. This is particularly true in the installation of exterior weather barrier roofs such as are used on large steel buildings. Characteristically such roofs are formed by sections of lightweight, corrugated sheet metal mounted on beams, or purlins, running longitudinally of the roof. Depending upon the area of the country involved, such roofs are normally inclined to a peak in a ratio of height to span of one to twelve or four to twelve. Conventional practice calls for the sections to be lifted to the roof and stacked. The workers then carry the sections or sheets along the purlins from the stack for individual positioning and installation. Due to the size of such roofs, a great deal of time is expended in carrying each section from the stack to the position in which it is to be installed. Since, even where the worker is moving along a portion of the roof on which the sheet metal has been installed, it is necessary to move only along the purlins to avoid damaging the lightweight sheet metal, the difficulty, expenditure of time and danger involved in installing the sections of sheet metal in this conventional fashion are considerable. Furthermore, the workers are confronted with such other difficulties as the lack of a convenient power source for their powered tools and the lack of a convenient means for securing themselves to the roof to avoid being injured by a fall.

While it is known to use remote controlled vehicles of a variety of types for transporting materials, there has heretofore been no such vehicle which could assist in the installation of sheet material to form exterior weather barrier roofs and the like because of the very fragile nature of such roof construction and because of the slope of such roofs. These difficulties are far more severe than those encountered in the construction of sub-roofs where heavier gauge metal and more plentiful supporting beams must be employed to support the weight of concrete which is subsequently poured over the sheet metal to complete the sub-roof. Furthermore, such sub-roofs are not inclined as in the case of exterior roofs.

Therefore, it has long been known that it would be desirable to have a device for transporting materials across fragile structures which possesses the capability for operation on a sloped, lightweight roof or similar structure to allow the transport of sheet materials thereacross during construction while minimizing the risk of damage to the structure so formed and which serves as a supply and support vehicle for workers during such construction.

SUMMARY OF THE INVENTION

Therefore, it is an object of the present invention to provide an improved transporting device which possesses the capability for operation on fragile surfaces such as those of an exterior weather barrier roof.

Another object is to provide such a device which is particularly well suited for use in the installation of sheet-type roofing materials by controlled operation along the roof of a building in supporting relation to a stack of such materials.

Another object is to provide such a device which is of minimal weight, which operates to distribute the weight of materials borne thereby evenly over a substantial surface area and which resists displacement from sloped surfaces.

Another object is to provide such a device which can be used individually or in multiples as the needs of the operation require without detracting from the operative advantages to be achieved in such use.

Another object is to provide such a device which is particularly well suited for use on pitched or sloped roofs resisting displacement by balancing the forces involved.

Another object is to provide such a device which can be operated from a remote location to move only along a narrow path of travel.

Another object is to provide such a device which operates both as a supply and support station for workers possessing all of the support systems necessary for installing sheet material to form a roof while at the same time serving as a fastening point to which workers can secure themselves so as to preclude injury from falls.

Another object is to provide such a device which lends itself to being deposited in multiples piecemeal on an initial portion of a roof, assembled on the roof to form a unitary apparatus composed of a plurality of the devices, and disassembled and removed from the roof subsequent to completion of the task and more particularly to such a device wherein these operations can be performed rapidly, efficiently and with a convenience not heretofore achieved.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 3 is a somewhat enlarged section taken on line 3—3 in FIG. 1.

FIG. 4 is a fragmentary horizontal section taken on line 4—4 in FIG. 3.

FIG. 5 is a section taken on line 5—5 in FIG. 3.

DESCRIPTION OF THE PREFERRED EMBODIMENT

Figure 1:
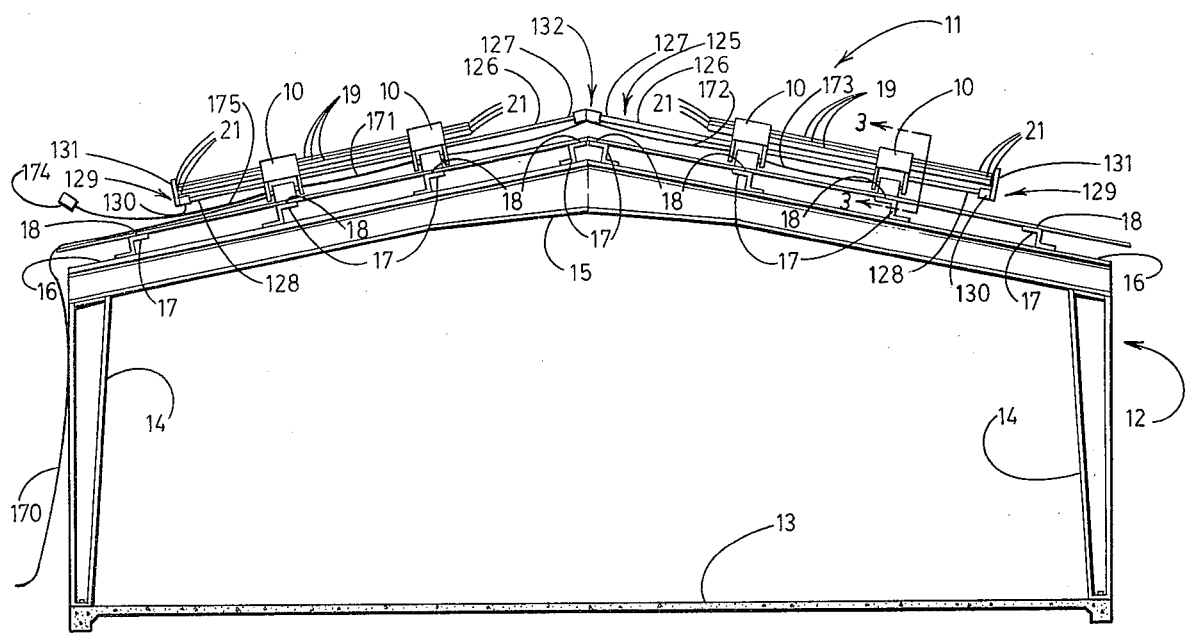
FIG. 1 is a front elevation showing the device of the present invention employed in multiples as the apparatus hereof in a typical operative environment.

Referring more particularly to the drawings, the mobile unit or device of the present invention is generally indicated by the numeral 10 in FIG. 1. As will hereinafter be described in greater detail, the device 10 of the present invention is adapted to be used individually as well as in multiples. Where several of the devices are used in combination, they are assembled to form the apparatus 11 of the present invention.

Figure 2:
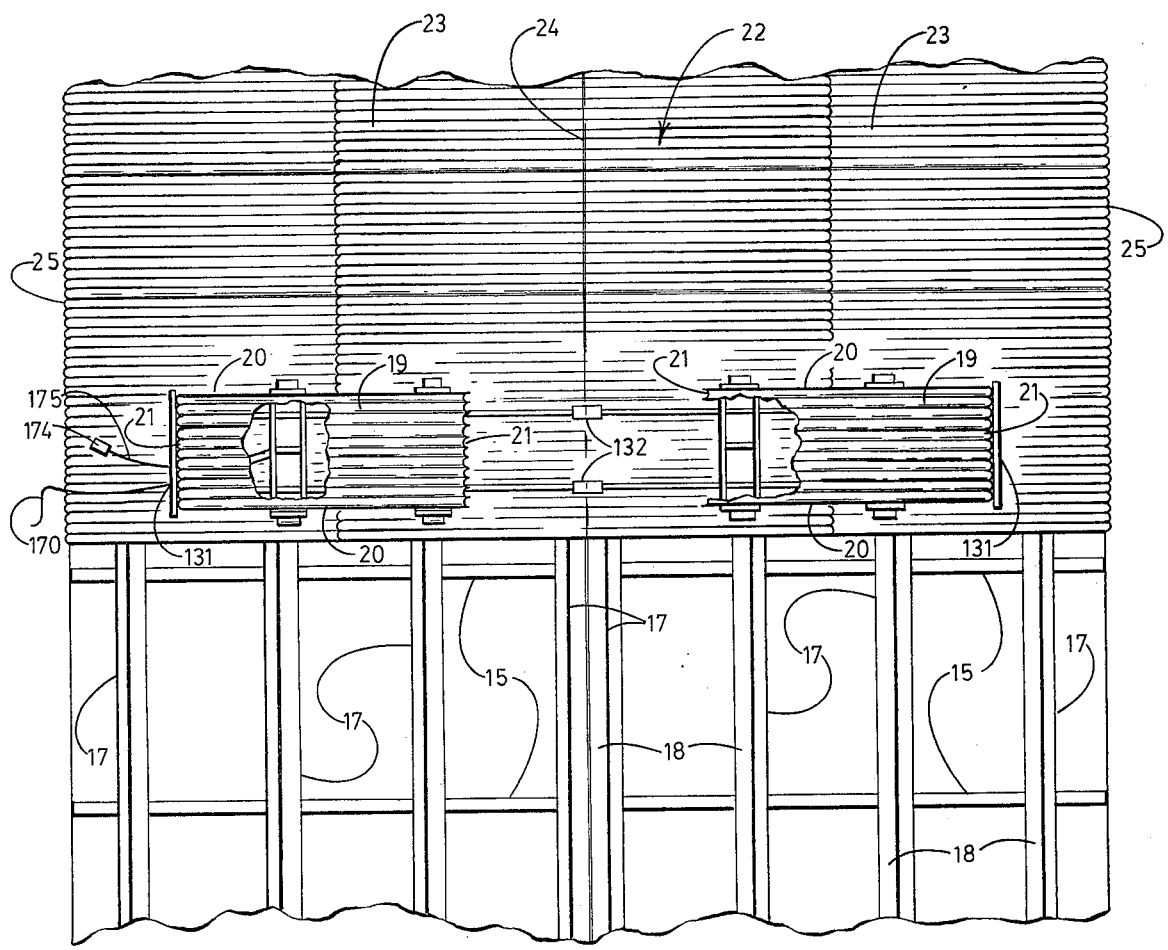
FIG. 2 is a fragmentary top plan view of the device as viewed in FIG. 1.

The device 10 is shown for illustrative convenience in the drawings in a typical operative environment employed in the construction of a metal building 12. The metal building has a foundation 13 on which are mounted a plurality of upright supports 14. A plurality of arched supporting beams 15 interconnect the upper ends of corresponding supports 14 to form the upwardly inclined configuration shown in FIG. 1. The supporting beams have inclined upper surfaces 16. A plurality of longitudinal beams or purlins 17 are mounted on the upper surfaces of the supporting beams extending longitudinally of the building in spaced, substantial parallel relation. The purlins themselves have upper surfaces 18. Sections 19 of corrugated sheet metal roofing material are shown in FIGS. 1 and 2. Each section 19 has opposite lateral edges 20 and opposite end edges 21. The sections 19 are installed on the purlins in side-by-side relation to form an exterior weather barrier roof 22. The roof, so installed, has a pair of sloped surfaces 23 which join to form a peak 24 for the roof. The sloped surfaces of the roof have opposite lateral edges 25. As shown in FIG. 3, when installed the sections of corrugated sheet material 19 are held in place by screws 26 fastened on to the purlins 17.

The device 10 of the present invention has a frame 30 affording a support platform 31. The platform is composed of a pair of spaced, substantially parallel upper longitudinal frame members 32 having opposite ends 33. Each of the longitudinal frame members has an upper surface 34. Three cross members 35 individually interconnect the longitudinal frame members in spaced substantially parallel relation. Each of the cross members has an upper surface 36 which is coplanar with the upper surfaces 34 of the longitudinal frame members. Suitable friction pads 37 are affixed on the upper surfaces of the members 32 and 35 so as to define the support platform 31 for the frame 30. The pads serve the purpose of resisting slidable movement from the support platform of the sections 19 which are stacked thereon as will hereinafter be described. Upstanding end plates 38 are fastened on the opposite ends 33 of the frame members 32. The frame, as so constructed, has a forward portion 39 on the left, as viewed in FIG. 1, and a rearward portion 40 on the right, as viewed therein.

The frame 30 has four vertical frame members 45 secured, as by welding, on the longitudinal frame members. Each longitudinal frame member mounts a pair of the vertical frame members individually spaced inwardly from the opposite ends 33 thereof and extending downwardly at right angles to the support platform 31. Each of the vertical frame members has opposite ends 46. A pair of cross members 47 are individually mounted on the downwardly extending opposite ends 46 of adjacent frame members 45 at the forward and rearward portions 39 and 40 of the frame extending in substantially right angular relation therebetween transversely of the frame. Four lower longitudinal frame members 48 are affixed on and interconnect the cross members 47 and lower opposite ends 46 of the frame members so as to extend longitudinally of the frame in spaced, substantially parallel relation, as best shown in FIG. 4. A pair of braces 49 are mounted on the lower opposite ends 46 of the vertical frame members 45 above the outermost cross members 47 on each side of the frame. The braces of each pair extend convergently, upwardly and are secured, as by welding, on the upper longitudinal frame member 32 thereabove, as best shown in FIG. 3. A backing or bottom plate 50 is fastened on and beneath the lower longitudinal frame members 48 of the frame extending beyond the cross members 47 at the forward and rearward portions 39 and 40 of the frame. The bottom plate has a substantially flat lower surface 51, a forward edge 52 and a rearward edge 53. The bottom plate is preferably constructed of a friction reducing substance such as "Teflon" or the like.

A pair of forward bearing mounting assemblies 60 are individually mounted on the vertical frame members 45 at the forward portion 39 of the frame 30. Each mounting assembly has a plate 61 fastened on the vertical frame member and upper longitudinal frame member 32. Each plate has a lower edge 62 on which is affixed an upper mounting member 63 extending in right angular relation forwardly from its respective vertical frame member 45. A lower mounting member 64 is borne by the vertical member in predetermined spaced relation to the upper mounting member and extending substantially parallel thereto. The mounting members 63 and 64 have corresponding forward end portions 65. A pair of guide plates 66 are individually affixed on the upper and lower mounting members of each forward bearing mounting assembly 60 disposed in coplanar relation. A bearing 67 is mounted for slidable movement on and between the guide plates 66 of each forward bearing mounting assembly 60 for movement to and from its respective vertical frame member 45. The bearings 67 of the mounting assemblies 60 define an axis of rotation 68 extending transversely of the frame. A cross bar 69 is fastened on the forward end portions 65 of the upper and lower mounting members 63 and 64 so as to extend therebetween, as best shown in FIG. 3. A screw threaded adjustment shaft 70 is fastened for rotational movement on each of the slidable bearings 67 by a linkage 71 and is extended through its respective cross bar 69. A pair of lock nuts 72 are screw-threadably received on the adjustment shaft 70 of each bearing mounting assembly 60 on opposite sides of the cross bar 69 thereof. It will be seen that loosening and readjustment of the lock nuts permits the bearings 67 to be slidably positioned on the guide plates 66 thereby permitting movement of the axis of rotation toward and from the vertical members 45 as desired. When each bearing is disposed in the desired position, the lock nuts are simply tightened into position in engagement with the cross bar to lock the bearing in the selected position.

A shaft 73 is received in the bearings 67 for rotational movement about the axis of rotation 68. A roller or drum assembly 74 is mounted on the shaft coaxial with the shaft for rotational movement therewith. The drum assembly has a cylindrical exterior surface 75.

A pair of rear bearing mounting assemblies 80 are individually mounted on the vertical frame members 45 at the rearward portion 40 of the frame 30. Each of the bearing mounting assemblies has a plate 81 secured, as by welding, on the vertical frame member and its respective adjacent longitudinal frame members 32. Each plate has a lower edge 82 on which is mounted an upper mounting member 83 extending rearwardly from and disposed at right angles to its respective vertical frame member. A lower mounting member 84 is borne by each vertical frame member at the rearward portion 40 of the frame beneath and in spaced, substantially parallel relation to its respective upper mounting member. The upper and lower mounting members of each rear bearing mounting assembly have rearwardly extending end portions 85. Bearings 87 are individually mounted on the upper and lower mounting members of each rear bearing mounting assembly. The bearings 87 define an axis of rotation 88 which is parallel to the axis of rotation 68 at the forward portion 39 of the frame.

A shaft 92 is mounted in the bearings 87 for rotational movement about the axis of rotation 88. A roller or drum assembly 93 is borne by the shaft for rotational movement therewith concentric to and about the axis of rotation. The drum assembly has a cylindrical exterior surface 94 and is composed of a pair of components 95 spaced to define a passage 96 therebetween. A sprocket 97 is affixed on the shaft within the passage 96 between the components 95. The diameter of the sprocket is smaller than that of the cylindrical exterior surface of the drum assembly. A continuous, flat conveyor belt 98 is extended about the cylindrical exterior surfaces 75 and 94 of the drum assemblies 74 and 93 for movement therewith. The conveyor belt has a lower run 99 which extends along the lower surface 51 of the bottom plate 50 and an upper run 100. The conveyor belt is preferably of a type having a woven durable backing with a resilient outer material. Thus, the belt is in and of itself flexible with cushioning properties while being flat and durable. It has been found that Goodyear "Roughtop" belting is excellently suited for the purpose. Such belting has a rough surface and an opposite smooth surface. Preferably the smooth surface extends about the drum assemblies 74 and 93 so that the rough surface faces outwardly for engagement with the roof. It is also preferred that belting material be bonded on to the exterior surface 94 of the drum assembly 93 with the rough surface disposed outwardly for engagement with the smooth surface of the conveyor belt to insure a positive drive. Extension of the lower run of the belt along the lower surface of the bottom plate prevents the lower run from flexing beyond the flat attitude shown in FIG. 3 with the exception of that caused by any deformation within the belt itself as a result of its cushioning properties.

A transmission 110 is secured on two of the lower longitudinal frame members 48, as best shown in FIG. 4. The transmission has an output shaft 111 on which is mounted a sprocket 112. A drive chain 113 operatively interconnects the sprocket 112 and the sprocket 97 of shaft 92 in driving relation. An electric motor 114 is borne by the transmission 110 in driving relation thereto. Thus, it will be seen that operation of the electric motor, as herein described, operates to rotate the drum assembly 93 through the transmission 110 and drive chain 113. Rotation of the drum assembly 93 in a counter clockwise direction, as viewed in FIG. 3 transports the lower run 99 of the conveyor belt 98 from left to right, as viewed in FIG. 3, in transporting relation to the frame. Selected positioning of the bearings 67 using the adjustment shafts 70, as heretofore described, operates to tighten or loosen the conveyor belt in order to achieve the optimum tension for driving of the belt.

A pair of fastening tubes 120 are individually affixed on the underside of the upper longitudinal frame members 32 against the vertical frame members 45 extending transversely of the frame adjacent to its forward and rearward portions 39 and 40 respectively. Each tube has opposite end portions 121 extending beyond the frame on opposite sides as shown in FIGS. 4 and 5. A thumbscrew 122 is secured in each of the opposite end portions and is adjustable into and out of the tube for locking engagement with an object received therewithin.

As best shown in FIGS. 1 and 2, two or more of the devices 10 can be interconnected to form the apparatus 11 of the present invention. This is accomplished using a connecting frame 125. The connecting frame is composed of two pairs of linking members 126. Each linking member has an inner end portion 127 and outer end portions 128. Where, as for example is shown in FIGS. 1 and 2, four of the devices 10 are to be interconnected, each linking member of a pair is slidably extended through the corresponding tubes 120 of two of the devices. With the devices disposed in side-by-side relation as shown in FIG. 1, the linking members of each pair are thus disposed in parallel relation. The devices are secured in this configuration by tightening the thumbscrews 122 downwardly into locking engagement with the linking members.

A stop assembly 129 is mounted on each pair of linking members. Each stop assembly has a pair of fasteners 130 which are individually secured on the outer end portions 128 of the linking members. The fasteners can be of any suitable type and mount an upwardly extending stop plate 131. The inner end portions 127 of both pairs of linking members are adapted to be interconnected by a pair of linking assemblies 132. Each of the linking assemblies has a pair of sleeves 133 joined to define an angle preferably approximating that of the pitch of the roof 22 on which the apparatus 11 is to be used. Each of the sleeves forming the linking assembly has a setscrew 134 mounted for adjustment into and out of the sleeve for locking engagement with the inner end portion 127 of a linking member 126. A suitable cable support slip 135 is fastened on one or both of the linking assemblies as desired.

Figure 7:
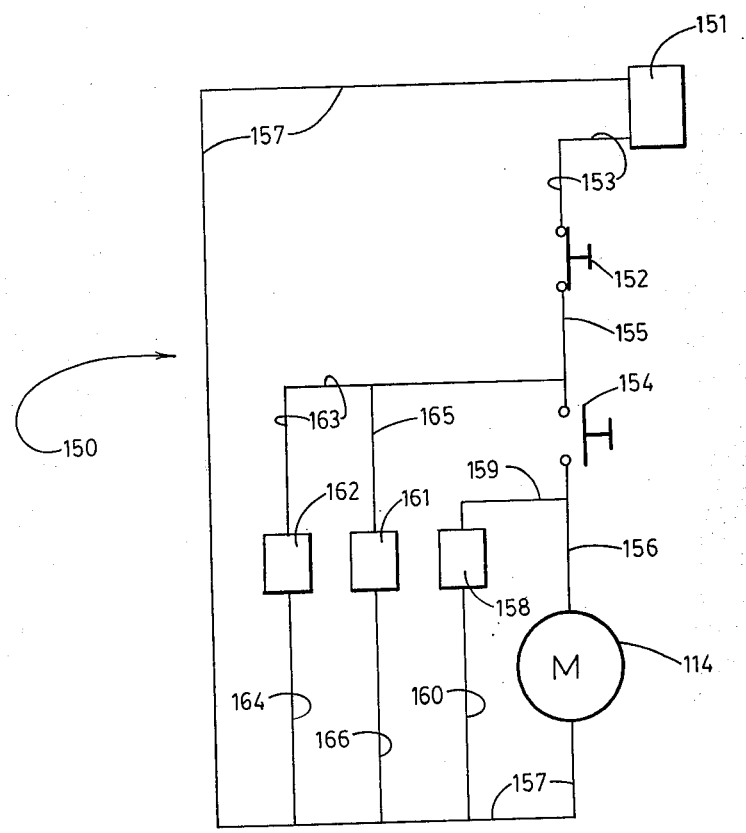
FIG. 7 is a schematic diagram of the electrical circuit of the device of the present invention.

Each of the devices 10 has an electrical circuit or control system preferably, although not necessarily, of the arrangement indicated at 150 in the schematic diagram of FIG. 7. The electrical circuit has a power source receptacle 151 to which a power supply cable is adapted to be connected as will subsequently be described. The electrical circuit also has a normally closed emergency stop switch 152. An electrical conductor 153 operably interconnects the receptacle 151 and the emergency stop switch 152. The electrical circuit has a normally open momentary start or control switch 154. An electrical conductor 155 operably interconnects switches 152 and 154. An electrical conductor 156 operably interconnects the start switch 154 and the electric motor 114. An electrical conductor 157 operably interconnects the motor 114 and the receptacle 151 thus constituting the return line for the electrical circuit 150.

The electrical circuit 150 has a power receptacle 158 which is adapted to serve as the electrical outlet for supplying power to the other devices 10 forming the apparatus 11. An electrical conductor 159 interconnects electrical conductor 156 and the power receptacle 158. An electrical conductor 160 operably interconnects the power receptacle 158 and the electrical conductor 157. Thus, it will be seen that the receptacle 158 and electric motor 114 are linked in parallel relation from the momentary start switch 154. Thus, closing of the switch 154, when the devices are connected as will be described, simultaneously controls operation of all of the devices forming the apparatus.

The electrical circuit 150 has a pair of receptacles 161 and 162 intended to be employed for supplying power for the operation of a pair of screw guns, not shown, used in fastening the sections of corrugated sheet material 19 on the purlins 17. Additional receptacles can be provided in the electrical circuit if desired. An electrical conductor 163 operably interconnects the electrical conductor 155 and receptacle 162. An electrical conductor 164 operably interconnects receptacle 162 and electrical conductor 157. An electrical conductor 165 interconnects conductor 163 and receptacle 161. An electrical conductor 166 operably interconnects receptacle 161 and electrical conductor 157. Thus, it will be seen that the receptacles 161 and 162 are linked in parallel in the electrical circuit from the emergency stop switch 152, but not through the momentary start switch 154. Thus, electrical energy is available from the receptacles 161 and 162 for the operation of screw guns, not shown, at all times when switch 152 is closed without being effected by the opening of start switch 154 controlling operation of the electric motor 114 and the motors of the other devices 10 through outlet 158.

As previously noted, the device 10 can be operated either individually or in multiples. In either case, an electrical cable 170, connected to a source of alternating current of 120 volts, is connected to the power source receptacle 151. Where several of the devices are to be used simultaneously as shown in FIGS. 1 and 2, the cable is only connected to the receptacle 151 of one of the devices. However, in this case, an electrical cable 171 interconnects and extends between the receptacles 158 of the device to which the cable 170 is connected and the adjacent device. Similarly, an electrical cable 172 interconnects and extends between the receptacles 158 of the two devices nearest and on opposite sides of the peak 24 of the roof 22, as shown in FIG. 1. The cable 172 is extended through the clip 135 to support the cable 172 over and above the peak 24 of the roof 22. An electrical cable 174 interconnects and extends between receptacles 158 of the adjacent devices 10 on the right as viewed in FIG. 1. Although not shown in the schematic diagram of FIG. 7 for purposes of illustrative convenience, the switches 152 and 154 can be mounted on a remote control box 174 and connected to the device 10 through an electrical control cable 175 is desired. This permits the device 10 either individually or in multiples to be operated from a position remote therefrom.

OPERATION

The operation of the described embodiment of the subject invention is believed to be clearly apparent and is briefly summarized at this point. As previously noted, the device 10 of the present invention can be used either individually or in multiple combinations to perform its functions. In either case, it is generally intended that the device be elevated to the roof 22 by any suitable means such as a forklift, not shown. Normally, several sections 19 of corrugated sheet metal will first be secured in place on the purlins 17 so as to form a supporting surface for the device in use. For illustrative convenience, the operation will be described in connection with the use of several of the devices 10 interconnected so as to form the apparatus 11. However, it will be understood that the operation in either case is substantially the same.

Four of the devices 10 are lifted onto the sloped surfaces 23 of the portion of the roof 22 which has been installed in position on the purlins. Similarly, the portions of the connecting frame 125 are deposited on the roof. Each of the devices is then oriented on the roof in individual longitudinal alignment with one of the purlins 17, as best shown in FIGS. 1 and 2. It is important that such alignment be as precise as possible in order to insure that the majority of the weight of the unit and its work load is borne by the purlin and not solely by a section 19 of corrugated sheet metal.

Figure 6:
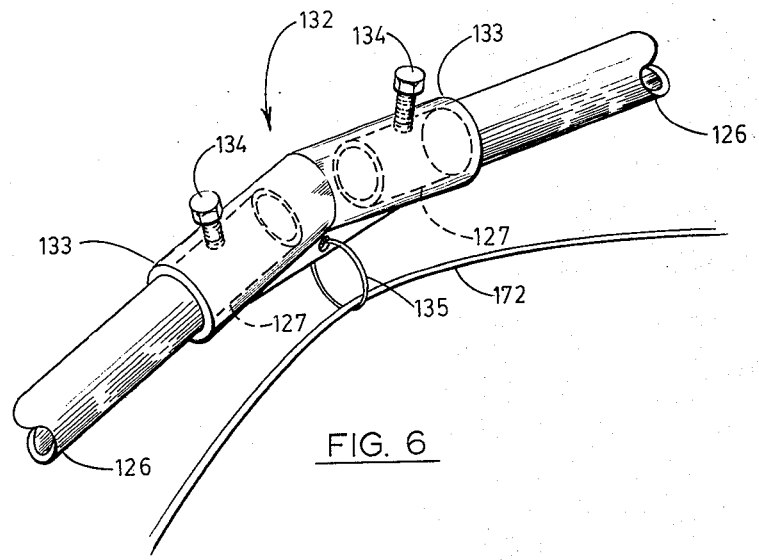
FIG. 6 is a somewhat further enlarged fragmentary perspective view of a linking assembly for the device of the present invention.

Thereafter, the linking members 126 are individually extended through the fastening tubes 120 of the devices 10 so that the inner end portions 127 of the linking members are disposed in substantial juxtaposition in alignment with and above the peak 24 of the roof 22 and with the outer end portions 128 extending toward the lateral edges 25 of the roof. The linking assemblies 132 are then positioned so that the juxtaposed inner end portions of the linking members are individually received in the sleeves 133, as shown in FIG. 6. The setscrews 134 are then tightened into locking engagement with the inner end portions to secure them in the position. Similarly, the thumbscrews 122 of each device 10 are tightened downwardly so as to bear against and lock the linking members 126 in their positions within the tubes. Finally, the stop assembly 129 is positioned with the fasteners 130 individually secured on the outer end portions 128 of each pair of linking members with the stop plate 131 extended upwardly therefrom.

The electrical cable 170 is connected to the receptacle 151 of the device 10 on the left as viewed in FIGS. 1 and 2. The electrical cables 171, 172 and 173 are individually connected to and extended between their respective receptacles 158 of adjoining devices 10. Thus, the electric motors 114 of the devices are linked in parallel and operated simultaneously from the start switch 154. Where the electrical control cable 175 and switch box 174 are employed, the switch box may be held by an operator at any suitable location on the roof 22 within the reach of the control cable 175.

The sections of corrugated sheet material 19 are stacked on the support platforms 30 of adjoining devices 10 of the apparatus 11 on opposite sides of the peak 24 of the roof 22, as shown in FIGS. 1 and 2. The friction pads 37 of the support platforms prevent sliding of the stacks from the platforms. The stop plates 131 operate to insure that the sheets will not slide from their respective support platforms, but it has been found that on roofs where the ratio of height to span is the normal one to twelve or four to twelve, the stop plates are actually not necessary except as a precaution. Subsequently, the sections of corrugated sheet material 19 are individually secured by workers on the upper surfaces 18 of the purlins 17 in end-to-end relation, as best shown in FIG. 2. Screw guns, not shown, which are individually connected to the receptacles 161 and 162 of the device 10 on the left, as viewed in FIGS. 1 and 2. The screw guns are operated in the conventional manner to secure the sections into position using screws 26, not shown in FIG. 3. Since the receptacles 161 and 162 are always "live" when the switch 152 is in its normal closed attitude, the screw guns can be operated at will even when the devices 10 are stationary.

When a portion of the roof 22 has been installed on the purlins 17 ahead of the direction of movement of the apparatus 11, an operator, by closing the normally open momentary start switch 154, causes the motors 114 of the devices 10 to operate simultaneously. Such operation of the motor of each device 10 rotates the drum assembly 93 thereof in a counterclockwise direction, as viewed in FIG. 3, through the transmission 110 and drive chain 113. Such rotation of the drum assembly 93 similarly rotates the conveyor belt 98 and drum assembly 74 in counterclockwise directions in transporting relation to the device. Thus, the devices 10 of the apparatus 11 are driven in unison over the roof 22. Each device is intended to move in a direction from right to left as shown in FIG. 3. However, it will be understood that drive can be reversed, if desired, to transport each device in the opposite direction as viewed in FIG. 3.

When the apparatus 11 and devices 10 thereof have been advanced as far as possible over the roof 22 to the positions in which the next sections of sheet material are to be installed, the operator releases the switch 54 of the switch box 76 which immediately breaks the circuit and stops the flow of power to the electric motors 114. Thus, movement of the apparatus and the devices thereof is terminated. Since the receptacles 161 and 162 are supplied with power through the emergency stop switch 152, the screw guns, not shown, can be operated even though switch 154 is in an opened condition. The stop switch 152 need only be opened in the case of emergency to stop all flow of current through the receptacles 161, 162, 158 and through the electric motor 114.

When construction of the roof 22 has been completed, the apparatus 111 is simply disassembled and lowered from the roof using a forklift, crane or other suitable device.

Therefore, the device of the present invention operates to transport the materials across fragile structures and has particular utility on sloped roofs of extremely lightweight construction minimizing the risk of damage to the structure and serving as a supply and support vehicle for workers during the construction operation.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A device for transporting materials across structures having an elongated rigid beam overlayed by relatively fragile sheet material, the device comprising a rigid frame; a pair of substantially cylindrical assemblies individually mounted on the frame for rotation about individual substantially parallel axes of rotation substantially normal to a predetermined path of travel for the device and one of said cylindrical assemblies composed of a pair of substantially axially aligned substantially cylindrical components spaced from each other to form a passage therebetween; a plate secured on the frame having a substantially flat lower surface extending between the cylindrical assemblies to edges individually adjacent to the cylindrical assemblies and the lower surface lying in a plane substantially tangent to the cylindrical assemblies; a continuous belt extending about said cylindrical assemblies having a substantially flat lower run extending between the cylindrical assemblies in facing engagement with the lower surface of said plate; and means borne by the frame and extending through said passage and into driving engagement with the cylindrical assembly thereof for rotating said cylindrical assembly to transport the belt about the cylindrical assemblies and the lower run of the belt along the lower surface of the plate with said lower run rested on said sheet material and aligned with and above the rigid beam to transport the device along said path of travel on the sheet material along the beam.

2. The device of claim 1 including a member having opposite end portions and having a configuration permitting the member to extend over the peak of a roof, formed by a plurality of said rigid beams extending in spaced relation to each other substantially parallel to the peak of the roof and overlayed by said sheet material, with said opposite end portions individually disposed above respective beams and means borne by the frame of the device for securing the device on one of the opposite end portions of the member whereby a pair of said devices can individually be secured on the opposite end portions of the member to permit transport of the devices individually along respective beams on the sheet material and to prevent the devices from falling off the roof laterally of the peak.

* * * * *